June 21, 1960 F. HARTL 2,941,217
RETRIEVER BUOY
Filed May 16, 1958
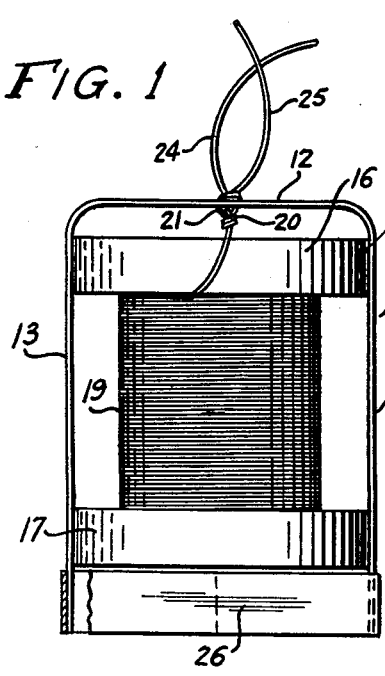
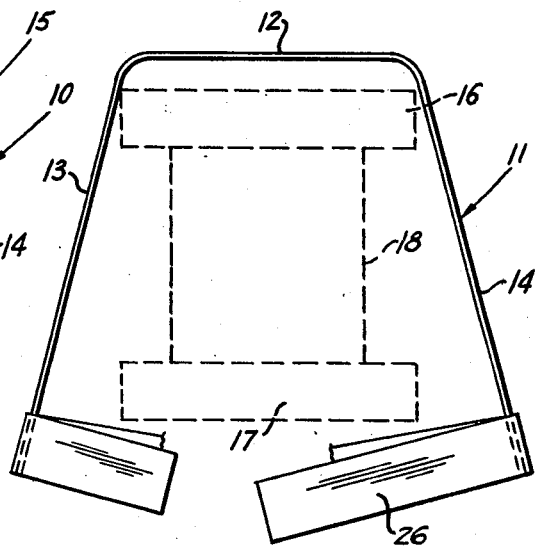
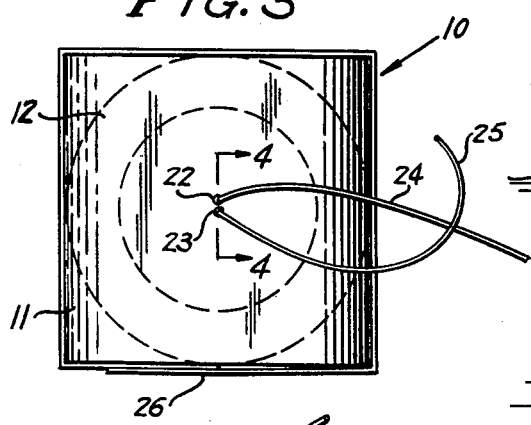
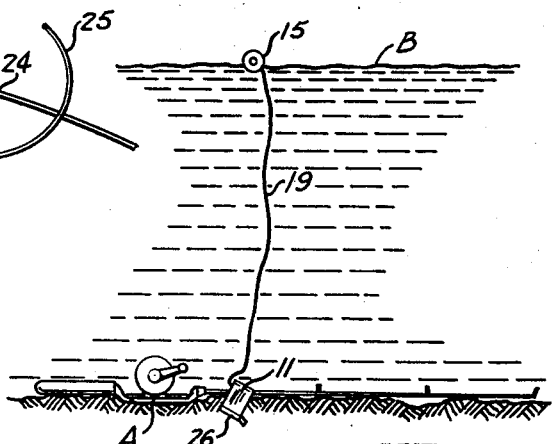
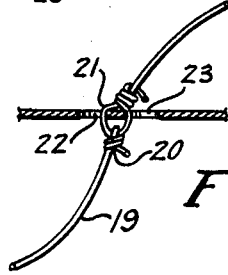
INVENTOR.
FRANK HARTL
BY
Patrick D Beavers
ATTORNEY.

Patented June 21, 1960

2,941,217

RETRIEVER BUOY

Frank Hartl, 3308 N. Oakley Ave., Chicago, Ill.

Filed May 16, 1958, Ser. No. 735,833

1 Claim. (Cl. 9—9)

This invention relates to improvements in retrievers that are especially adapted to retrieve articles that have been accidentally dropped into deep water.

An object of this invention is to provide a retriever that will locate a fishing rod, an outboard motor or other articles that may be accidentally dropped overboard or may even be used to locate people who have fallen overboard.

Another object of the invention is to provide a retriever that includes a water soluble material that will confine the retriever into a compact package for attachment to articles or other items, but when dropped into the water will dissolve and permit the retriever to rise to the surface of the water.

With the above and other objects and advantages in view, the invention consists of the novel details of construction, arrangement and combination of parts more fully hereinafter described, claimed and illustrated in the accompanying drawing, in which:

Fig. 1 is an elevational view of a retriever embodying the invention;

Fig. 2 is an elevational view of the float retaining spring member and the retaining band for the spring member in ruptured condition and showing in dotted line the relation of the float and the spring member.

Fig. 3 is a top plan view of Fig. 1;

Fig. 4 is a detailed fragmentary sectional view on the line 4—4 of Fig. 3; and

Fig. 5 is a view of a body of water with a fishing rod sunk to the bottom thereof and the float on the surface of the water and the line tied to the float and to the fishing rod to indicate the location of the fishing rod.

Referring more in detail to the drawing, wherein like parts are designated by like reference numerals, the reference numeral 10 is used to designate a retriever embodying the invention.

The retriever 10 comprises a U-shaped spring member 11 that is made from a strip of spring steel and includes a base 12 and a pair of arms 13 and 14 that extend from each end of the base 12 at right angles thereto.

The spring member 11 is adapted to confine, between the arms 13 and 14, a float 15 which comprises a pair of circular ends 16 and 17, respectively, that are joined by a cylinder 18, as shown in dotted lines in Fig. 2.

A line 19, such as a nylon fishing line, is wound on the cylinder 18 intermediate of the ends 16 and 17 and the free end of the line 19 is tied as at 20 to a loop 21.

The loop 21 extends through a pair of spaced openings 22 and 23, respectively, that are provided in the base 12 centrally thereof.

A pair of short lines 24 and 25 extend from the loop 21 and the lines 24 and 25 are used to attach the retriever 10 to a fishing rod A, as in Fig. 5 or to any other article that may be dropped accidentally into deep water.

A paper band 26 is positioned about the ends of the arms 13 and 14 below the float 15 and when the band 26 is intact, the band 26 will retain the float 15 between the arms 13 and 14. However, when the band 26 has been ruptured, as shown in Fig. 2, the float will rise to the surface of the water, as shown in Fig. 5.

In use, therefore, when the lines 24 and 25 have been tied around a fishing rod A and the rod A has been accidentally dropped overboard, the band 26 will rupture and the float 15 will rise to the surface of the water B. As the float 15 rises, the line 19 will unwind and when the float 15 has been retrieved the fishing rod A may be pulled out of the water B by means of the line 19.

There has thus been provided a retriever that will indicate the location of articles accidentally dropped into deep water and if the article is light enough will permit the article to be pulled out of the water.

It is believed that from the foregoing description the structure and manner of use of the retriever will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A retriever for locating articles dropped into deep water, comprising a U-shaped spring member made of a strip of spring steel and including a base having an arm extending from each end thereof at right angles thereto, a float having a pair of circular ends joined by a cylindrical mid portion positioned within said U-shaped member with one of said circular ends in engagement with said base, a paper band extended over the ends of the arms outwardly of the other end of said float, said base having a pair of spaced openings therein centrally thereof, said float having a line thereon and one end of said line connected to the openings in said base and short strings extending from said openings for connecting said U-shaped member to an article.

References Cited in the file of this patent

UNITED STATES PATENTS

| | | |
|---|---|---|
| 2,479,021 | Perkins | Aug. 16, 1949 |
| 2,738,524 | Peay | Mar. 20, 1956 |